United States Patent

Kuriyama

[11] Patent Number: 5,812,366
[45] Date of Patent: Sep. 22, 1998

[54] SOLID ELECTROLYTIC CAPACITOR

[76] Inventor: Chojiro Kuriyama, c/o Rohm Co., Ltd. 21, Saiin Mizosaki-cho, Ukyo-ku, Kyoto-shi, Kyoto 615, Japan

[21] Appl. No.: 702,629
[22] PCT Filed: Feb. 29, 1996
[86] PCT No.: PCT/JP96/00494
  § 371 Date: Sep. 3, 1996
  § 102(e) Date: Sep. 3, 1996
[87] PCT Pub. No.: WO96/27889
  PCT Pub. Date: Dec. 9, 1996

[30] Foreign Application Priority Data

Mar. 3, 1995 [JP] Japan .................................. 7-044236

[51] Int. Cl.⁶ .................................................. H01G 9/00
[52] U.S. Cl. ...................... 361/523; 361/529; 361/534; 361/537; 29/25.03
[58] Field of Search ........................... 361/502, 503, 361/508, 509, 516, 519, 520, 522–523, 525, 528, 529, 532, 537, 540; 29/25.03

[56] References Cited

U.S. PATENT DOCUMENTS

| | | | |
|---|---|---|---|
| 4,164,005 | 8/1979 | Cheseldine | 361/540 |
| 5,005,107 | 4/1991 | Kobashi et al. | 361/540 |
| 5,349,496 | 9/1994 | Taniguchi et al. | 361/528 |
| 5,428,501 | 6/1995 | Bruder | 361/535 |
| 5,638,253 | 6/1997 | Hasegawa | 361/535 |

FOREIGN PATENT DOCUMENTS 54-50139 U   6/1979   Japan .

Primary Examiner—Kristine L. Kincaid
Assistant Examiner—Anthony Dinkins

[57] ABSTRACT

A solid electrolytic capacitor according to the present invention includes a chip substrate segment (12), a sintered chip (21) of metal powder mounted on an upper surface of the chip substrate segment (12), a solid electrolyte layer (23) formed on the chip (21) in electrical insulation from the metal powder of the chip (21) via a dielectric film (22), a resin coating (25) covering the chip (21) with a portion of the solid electrolyte layer (23) exposed, a cathode terminal electrode film (27) formed in electrical conduction with the exposed portion of the solid electrolyte layer (23), and an anode terminal electrode film (28) formed on the chip substrate segment (12) in electrical conduction with the metal powder of the chip (21).

10 Claims, 23 Drawing Sheets

F I G. 4
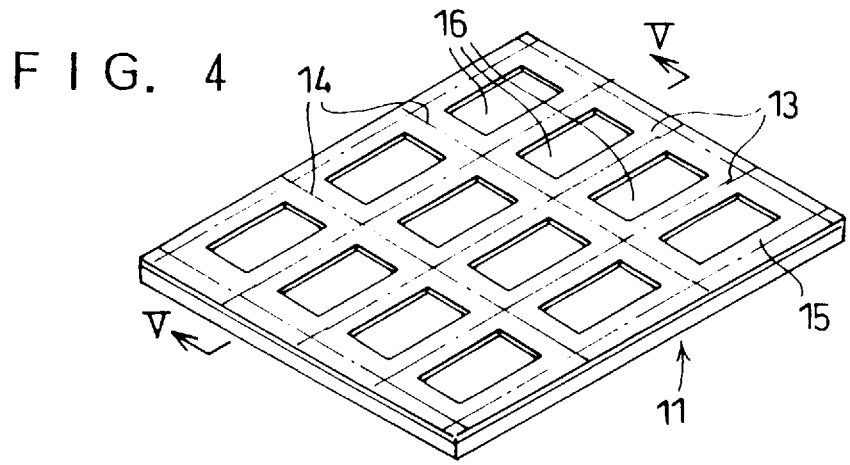
F I G. 5
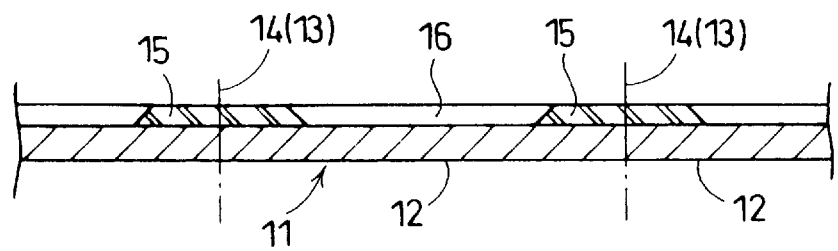
F I G. 6
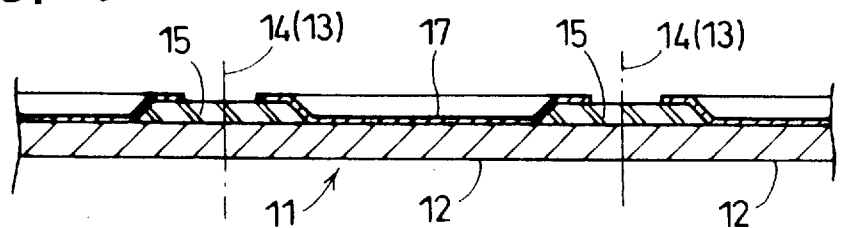

F I G. 9
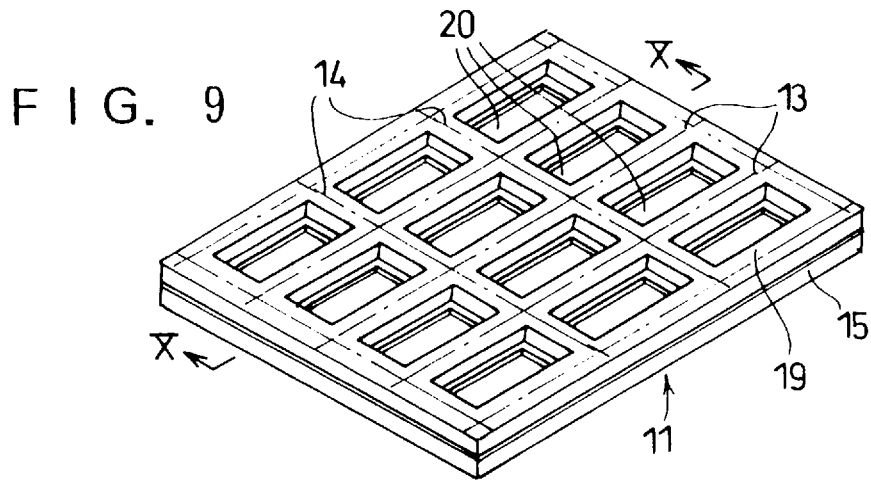
F I G. 1 0
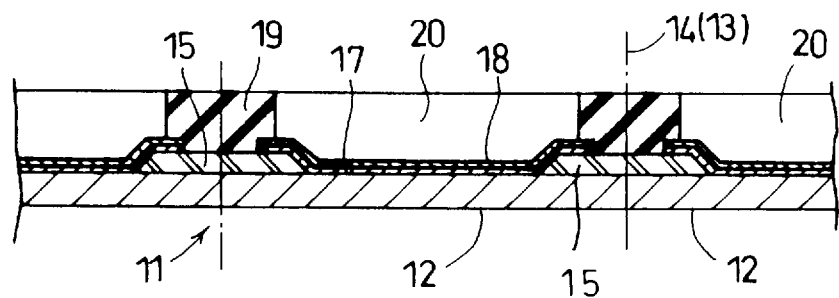
F I G. 1 1
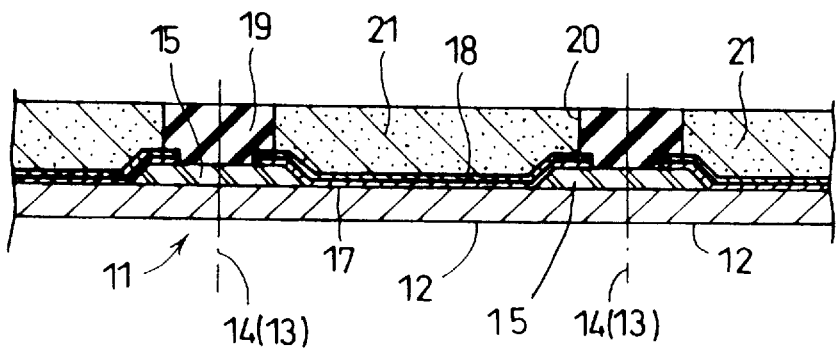

FIG. 20
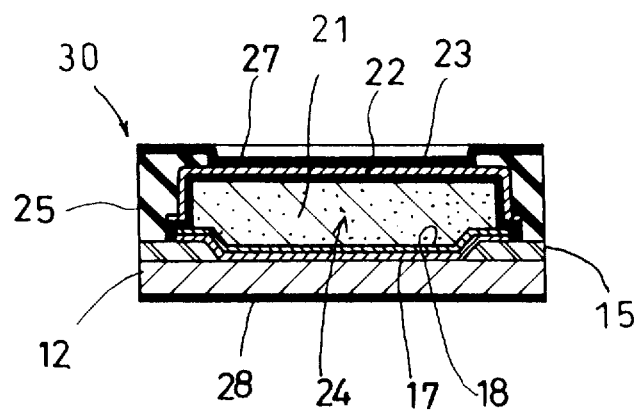
FIG. 21
FIG. 22
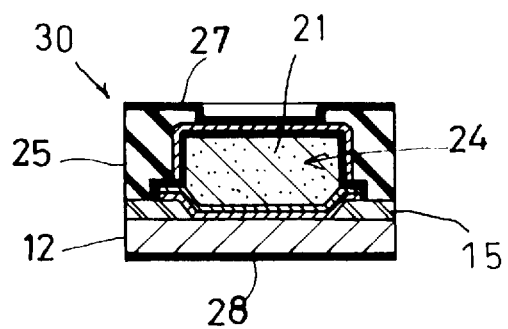

SOLID ELECTROLYTIC CAPACITOR

TECHNICAL FIELD

This invention relates generally to solid electrolytic capacitors such as tantalum capacitors. More specifically, the present invention relates to a solid electrolytic capacitor which is suitably designed for surface mounting. The present invention also relates to a process for making such a solid electrolytic capacitor.

BACKGROUND ART

Conventionally, a capacitor element for use in a solid electrolytic capacitor of this type was most typically manufactured in the following manner.

First, as shown in FIG. 57 of the accompanying drawings, metal powder such as tantalum powder is compacted into a porous chip 2 from which a metal anode wire 3 made of e.g. tantalum projects out and thereafter sintered.

Then, as shown in FIG. 58, the chip 2 is immersed in a chemical solution A such as aqueous solution of phosphoric acid, and a direct current is passed between the anode wire 3 and the solution A for performing anodic oxidation. As a result, a dielectric film 4 of tantalum pentoxide for example is formed on the surfaces of the metal particles of the chip 2.

Then, as shown in FIG. 59, the steps are repeated plural times which comprise immersing the chip 2 in an aqueous solution B of manganese nitrate until the manganese nitrate solution B permeates into the chip 2, and thereafter lifting out the chip for baking. As a result, a solid electrolyte layer 5 of a metal oxide such as manganese dioxide is formed on the surface of the dielectric film 4.

Finally, a cathode film made of a metal such as silver or nickel is formed after graphitizing the surface of the solid electrolyte layer 5 of the chip 2. This provides a capacitor element 1.

As described above, in making the capacitor element 1 for the prior art solid electrolytic capacitor, the anode wire 3 projecting from the chip 2 is indispensable and cannot be obviated. Therefore, it was conventional to employ the structure of FIG. 60 or 61 for making a surface-mounting type solid electrolytic capacitor by incorporating the capacitor element 1.

Specifically, according to the structure shown in FIG. 60, the capacitor element 1 is arranged between a cathode lead terminal 6a and an anode lead terminal 6b. The chip 2 of the capacitor element 1 is attached to the cathode lead terminal 6b, whereas the anode wire 3 is attached to the anode lead terminal 6a. The capacitor element 1 together with the inner ends of the respective lead terminals 6a, 6b is enclosed in a molded synthetic resin package 7. The solid electrolytic capacitor of such a structure is disclosed in Japanese Patent Application Laid-open No. 60-220922 for example.

According to the structure shown in FIG. 61, on the other hand, the capacitor element 1 is enclosed in a molded synthetic resin package 8 in a manner such that the tip portion of the anode wire 3 and the end face of the chip 2 opposite to the anode wire 3 are exposed. The exposed tip portion of the anode wire 3 is formed with an anode terminal portion 9a made of e.g. solder, whereas the exposed end face of the chip is formed with a cathode terminal portion 9b made of e.g. solder.

However, in either one of the above-described solid electrolytic capacitors, the capacitor element 1 need be enclosed in the resin package 7, 8 in such a manner as to contain both the chip 2 and the projecting anode wire 3. Therefore, the package 7, 8 must be larger in size than the chip 2 of the capacitor element 1 by as much as the anode wire 3 projects out from the chip 2, so that the ratio of the volume of the chip 2 relative to the overall volume of the capacitor decreases to result in a volume efficiency reduction. Further, the effective volume of the chip 2 also reduces by as much as the anode wire 3 is embedded in the chip 2. Due to these factors, the prior art solid electrolytic capacitor poses difficulty in increasing the capacitance per unit volume while also giving rise to a weight increase problem. These problems are particularly remarkable with respect the solid electrolytic capacitor having the structure of FIGS. 60 which incorporates the two lead terminals 6a, 6b.

Additionally, in each of the solid electrolytic capacitors, large stresses are applied to the chip 2 when molding the resin package 7, 8, which results in an increase of leak current (LC) and increased likelihood of insulation failure. Thus, the percentage of rejectable products becomes high to result in a low yield.

Further, when conventionally making a plurality of capacitor elements 1 at a time, each of the projecting anode wires 3 of plural sintered chips 1 is attached to a metal bar 10 of e.g. tantalum, as shown in FIG. 62. In this condition, various process steps are performed which include forming the dielectric layer 4 by immersion in the chemical solution A (FIG. 58), forming the solid electrolyte layer 5 by immersion in the aqueous solution B of manganese nitrate (FIG. 59), graphitizing, forming the cathode film, and the like. After these steps, each of the capacitor elements 1 is cut off the metal bar 10. Therefore, there is a limitation in the number of capacitor elements 1 which can be produced by using the single metal bar 10, so that there is difficulty in meeting the requirements for mass production. Thus, combined with a low yield of production, a production cost will result.

In particular, since the solid electrolytic capacitor of the type shown in FIG. 60 incorporates the two lead terminals 6a, 6b, it is necessary to perform additional steps of attaching the respective lead terminals 6a, 6b to the capacitor element 1 and bending the lead terminals 6a, 6b as shown. Thus, the production cost becomes even higher in comparison with the solid electrolytic capacitor shown in FIG. 61.

DISCLOSURE OF THE INVENTION

It is, therefore, an object of the present invention to provide a surface mounting type solid electrolytic capacitor which overcomes the above-described problems.

Another object of the present invention is to provide a process for making such a solid electrolytic capacitor.

According to a first aspect of the present invention, there is provided a solid electrolytic capacitor comprising: a chip substrate segment; a sintered chip of metal powder mounted on an upper surface of the chip substrate segment; a solid electrolyte layer formed on the chip in electrical insulation from the metal powder of the chip via a dielectric film; a resin coating covering the chip with a portion of the solid electrolyte layer exposed; a cathode terminal electrode film formed in electrical conduction with the exposed portion of the solid electrolyte layer; and an anode terminal electrode film formed on the chip substrate segment in electrical conduction with the metal powder of the chip.

With the arrangement described above, it is only necessary to cover the side surfaces of the capacitor element with the resin coating, and an anode wire projecting from the chip may be obviated. Therefore, since the effective volume of the chip will not be decreased due to the presence of the anode wire, the ratio of the volume of the chip relative to the overall volume can be reliably increased in comparison with a conventional solid electrolytic capacitor having an anode wire, thereby realizing an improvement of space efficiency and a size reduction. In particular, a great size and weight reduction is obtainable over the solid electrolytic capacitor of the type which has metal plate lead terminals as shown in FIG. 60.

The chip substrate segment may be formed with a filling bore extending from the upper surface thereof, and the metal powder of the chip may be made to fill in the filling bore. This arrangement leads to a volume increase of the chip to additionally enhance the volume efficiency, thereby increasing the capacitance of the solid electrolytic capacitor per unit volume. In particular, in case where the filling bore is a through-bore, a portion of the metal powder filled in the through-bore is directly bonded to the anode terminal electrode film on the lower surface of the chip substrate segment, thereby providing an additional volume increase of the chip while also improving reliability of electrical conduction between the metal powder of the chip and the anode terminal electrode film.

The chip substrate segment may be made of a material which has electrical conductivity at least in a thickness direction of the chip substrate segment, and the metal powder of the chip may be electrically connected to the chip substrate chip with the anode terminal electrode film formed on the chip substrate chip. In this case, since the chip substrate segment itself takes the place of a conventional anode wire and is therefore effective in enhancing the volume efficiency. Further, if an insulating layer is formed on the upper surface of the chip substrate segment to surround the chip, it electrically insulates between the chip substrate segment and the solid electrolyte layer, thereby reliably preventing current leakage between the two.

According to a second aspect of the present invention, there is provided a process for making solid electrolytic capacitors comprising the steps of: preparing a master substrate corresponding in size to a plurality of chip substrate segments; compacting metal powder on an upper surface of the master substrate into porous chips at positions corresponding to the chip substrate segments; heating each of the chips for sintering; forming a dielectric layer on each said chip of metal powder; forming a solid electrolyte layer on the dielectric layer; applying a resin coating at least on side surfaces of said each chip; forming a cathode terminal electrode film on the solid electrolyte layer of each said chip, while also forming an anode terminal layer on a lower surface of the master substrate at least at positions corresponding to the chip substrate segments; and cutting the master substrate between the chips for division into the respective chip substrate segments.

With the process described above, the step of compacting the metal powder into the chips and the step of heating the chips for sintering can be performed simultaneously with respect to plural items by using the single master substrate. In addition, the subsequent steps of forming the dielectric film, the solid electrolyte layer, the resin coating, the anode terminal electrode film and the cathode terminal electrode film can also be performed under the condition wherein the plural chips are bonded to the master substrate. Finally, the master substrate need only be cut between the respective chips for division into the respective chip substrate segments, thereby yielding a plurality of surface-mounting type solid electrolytic capacitors at one time. Therefore, the manufacturing process of the present invention is more suitable for mass production than the prior art process wherein a plurality of solid electrolytic capacitors are separately manufactured.

In addition, by applying the resin coating at least on the side surfaces of each chip, it is possible to reliably decrease the likelihood of increasing the leak current (LC) and insulation failure occurrence. Thus, combined with the above-described suitability for mass production, the process of the present invention which is capable of decreasing the occurrence of rejectable products is advantageous in greatly reducing the production cost.

Various features and advantages of the present invention will be become apparent from the following description of the preferred embodiments given with reference to the accompanying drawings.

BRIEF DESCRIPTION OF THE DRAWINGS

FIG. 4 is a perspective view showing the state wherein the insulating layer of the same master substrate is formed with bonding openings;

FIG. 5 is an enlarged sectional view taken along lines V—V in FIG. 4;

FIG. 6 is an enlarged sectional view showing the state wherein a thin film of tantalum silicide is formed in the bonding openings according to the first embodiment;

FIG. 9 is a perspective view showing the state wherein shaping bores are formed in the frame layer;

FIG. 10 is an enlarged sectional view taken along lines X—X in FIG. 9;

FIG. 11 is an enlarged sectional view showing the state wherein tantalum powder is compacted into chips in the shaping bores of the frame layer;

FIG. 20 is a perspective view showing a solid electrolytic capacitor made according to the first embodiment;

FIG. 21 is an enlarged sectional view taken along lines XXI—XXI in FIG. 20;

FIG. 22 is an enlarged sectional view taken along lines XXII—XXII in FIG. 20;

BEST MODE FOR CARRYING OUT THE INVENTION

Embodiments of the present invention are described below with reference to the accompanying drawings.

FIGS. 1 through 22 show a first embodiment of the present invention. In this embodiment, a tantalum solid electrolytic capacitor 30 (FIG. 20) is manufactured by using a master substrate made of silicon.

Figure 1:
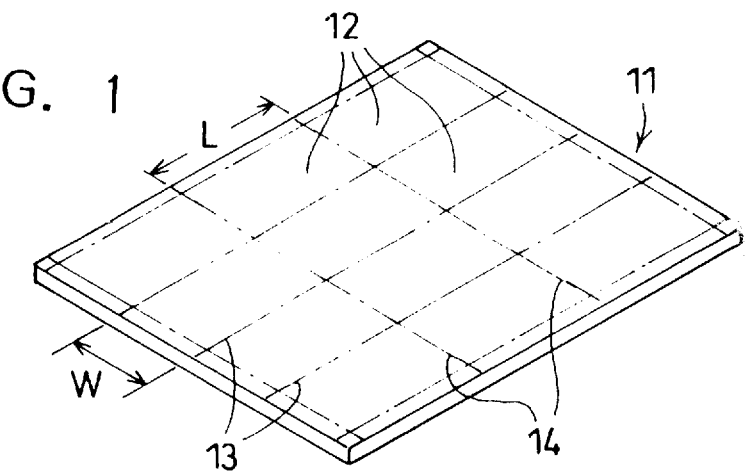
FIG. 1 is a perspective view showing a master substrate for use in a first embodiment of the present invention.

According to the first embodiment, a master substrate 11 made of silicon is first prepared which has electric conductivity in the thickness direction, as shown in FIG. 1. The master substrate 11 corresponds in size to a plurality of chip substrate segments 12 each of which is rectangular with a width W and a length L. As described hereinafter, the master substrate 11 provides the plurality of chip substrate segments 12 when cut along longitudinal cutting lines 13 and transverse cutting lines 14 in the final process step.

Figure 2:
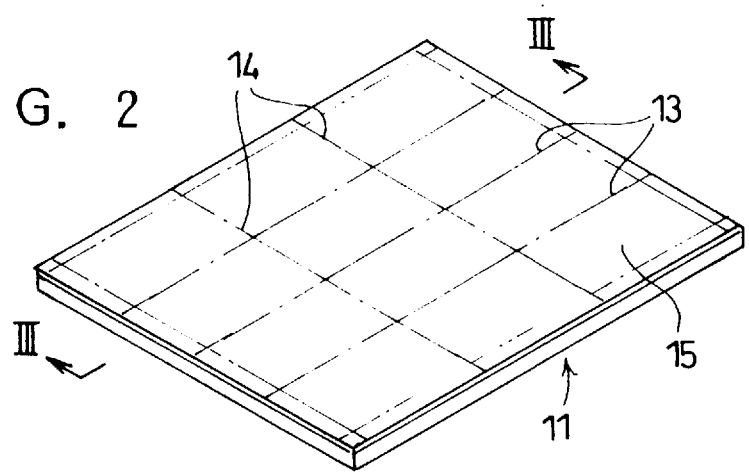
FIG. 2 is a perspective view showing the same master substrate which is formed with an insulating layer.
Figure 3:
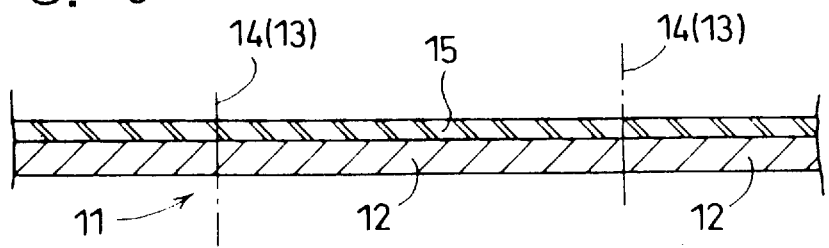
FIG. 3 is an enlarged sectional view taken along lines III—III in FIG. 2.

Then, as shown in FIGS. 2 and 3, an insulating film 15 made of silicon oxide or nitride for example is formed on the master substrate 11 by thermal oxidation, PV sputtering or plasma CVD for example.

Then, as shown in FIGS. 4 and 5, rectangular bonding openings 16 are formed, by known photolithography for example, in the insulating film 15 at the portions thereof corresponding to the respective chip substrate segments 12. The photolithography includes the steps of forming a photoresist film on the upper surface of the insulating film 15, placing on the photoresist film a photomask having windows which are identical in configuration to the bonding openings 16, irradiating the masked photoresist film for subsequent development, removing the portions of the photoresist film corresponding to the windows, and etching the insulating film 15 in this condition to remove the dissolved portions thereof corresponding to the windows for thereby forming the bonding openings 16.

Then, as shown in FIG. 6, a thin film 17 of tantalum silicide is formed on the master substrate 11 at each of the bonding openings 16 by sputtering for example.

Figure 7:
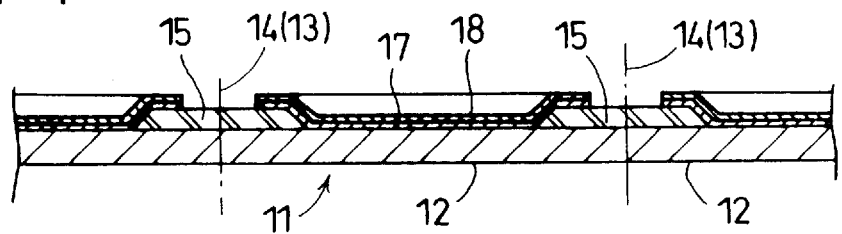
FIG. 7 is an enlarged sectional view showing the state wherein a bonding metal layer is formed on the thin film of tantalum silicide.

Then, as shown in FIG. 7, a metal layer 18 of tantalum as a bonding layer is formed on the thin film 17 similarly by sputtering for example.

Figure 8:
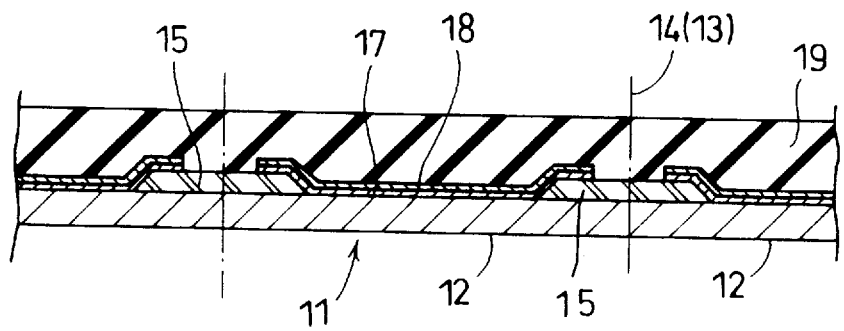
FIG. 8 is an enlarged sectional view showing the state wherein a frame layer is formed on the same master substrate according to the first embodiment.

Then, as shown in FIG. 8, a frame layer 19 of e.g. a synthetic resin having a relatively large thickness is formed over the entire upper surface of the master substrate 11.

Then, as shown in FIGS. 9 and 10, shaping bores 20 are formed, by photolithography for example, in the shaping layer 19 at the portions thereof corresponding to the respective chip substrate segments 12. It should be noted however that, in place of the process steps shown in FIGS. 8 through 10, a frame layer 19 having previously formed shaping bores 20 may be adhered to the master substrate 11.

Then, as shown in FIG. 11, a suitable amount of tantalum powder previously mixed with a binder is loaded into each of the shaping bores 20 of the frame layer 19 and compacted for forming a porous chip 21 which is subsequently subjected to a debinder treatment wherein the binder is removed by heating for example.

Figure 12:
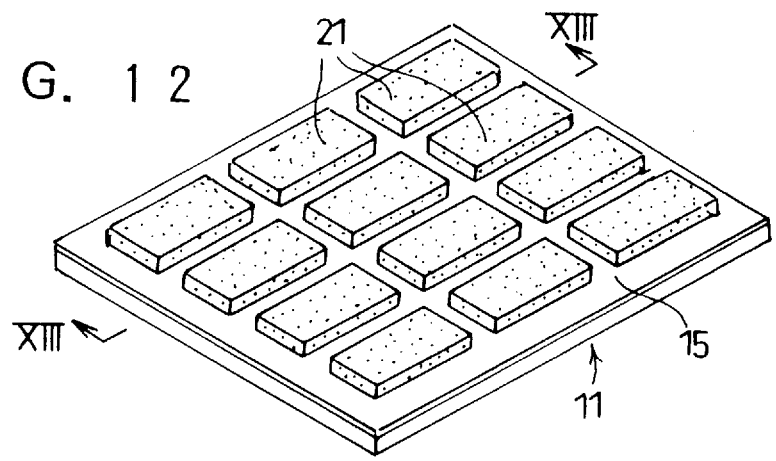
FIG. 12 is a perspective view showing the state wherein the frame layer has been removed in the first embodiment.
Figure 13:
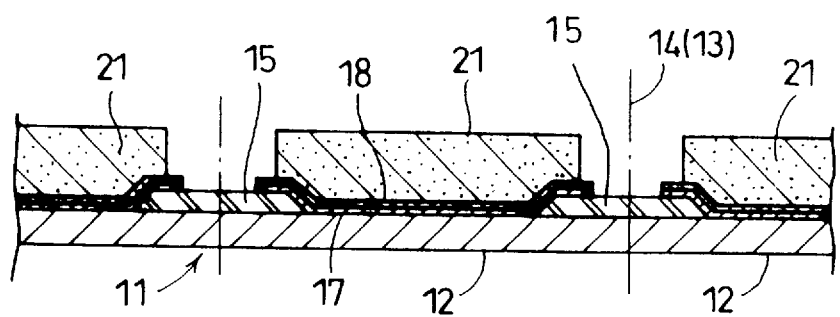
FIG. 13 is an enlarged sectional view taken along lines XIII—XIII in FIG. 12.

Then, as shown in FIGS. 12 and 13, the frame layer 19 is removed by suitable means such as peeling or etching. It should be noted that the above-described binder removal may be performed after the removal of the frame layer 19.

Then, the master substrate 11 together with the related parts formed thereon is placed in a vacuum heating oven (not shown) and heated to the sintering temperature of tantalum under vacuum. As a result, the tantalum powder constituting each chip 21 is sintered while also fusing to the bonding metal layer 18, thereby electrically connecting the chip 21 to the master substrate 11. In this sintering step, the thin layer 17 of tantalum silicide as a backing for the bonding metal layer 18 of tantalum performs the following function. Specifically, absent the thin layer 17 of tantalum silicide, tantalum within the bonding metal layer 17 abnormally diffuses into the silicon master substrate 11 due to the heat of sintering, so that the bonding strength between the chip 21 of tantalum powder and the silicon master substrate 11 will greatly reduce. By contrast, the presence of the tantalum silicide thin layer 17 prevents diffusion of tantalum from the bonding metal layer 18 into the master substrate 11, so that the chip 21 will be bonded reliably and stably onto the master substrate 11.

Figure 14:
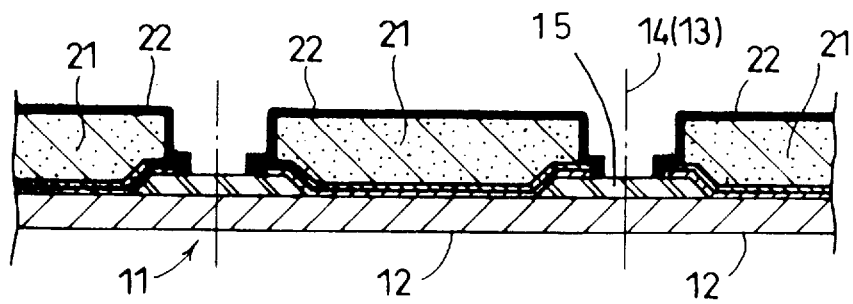
FIG. 14 is an enlarged sectional view showing the state wherein a dielectric layer has been formed on the chips according to the first embodiment.

Then, the master substrate 11 together with the related parts formed thereon is immersed in a chemical solution (not shown) such as aqueous solution of phosphoric acid to perform anodic oxidation by passing a direct current between the master substrate 11 and the chemical solution. As a result, a dielectric film 22 of tantalum pentoxide is formed on the surfaces of the tantalum particles of each chip 21 as well as on the exposed surfaces of the thin film 17 and bonding metal layer 18, as shown in FIG. 14, as shown in FIG. 14.

Figure 15:
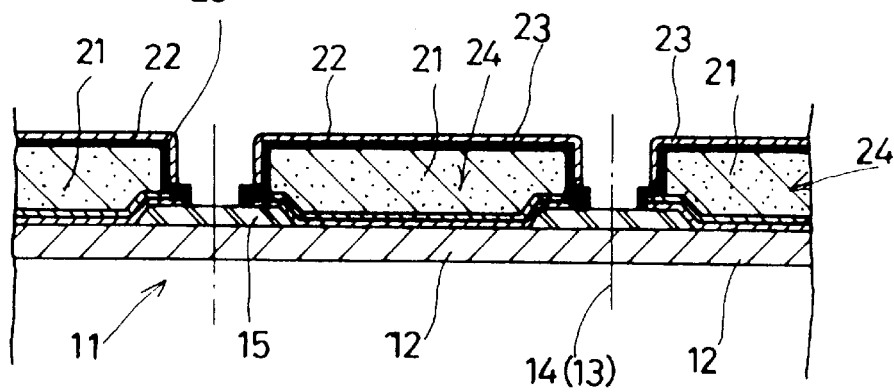
FIG. 15 is an enlarged sectional view showing the state wherein a solid electrolyte layer has been formed on the chips according to the first embodiment.

Then, the steps are repeated plural times which comprises immersing each chip 21 on the master substrate 11 in an aqueous solution of manganese nitrate (not shown) until the solution permeate into the chip 21, and baking the chip 21 after lifting it out of the manganese nitrate solution. As a result, a solid electrolyte layer 23 of manganese dioxide is formed on the surface of the tantalum pentoxide dielectric layer 22, thereby providing a capacitor element 24, as shown in FIG. 15. It should be noted that the solid electrolyte layer 23 may be made of a conductive electrolytic polymer which can be formed by chemical polymerization, electrolytic oxidizing polymerization, gas-phase polymerization or the like, as disclosed in Japanese Patent Application Laid-open Nos. 60-37114 and 1-253226 for example.

Figure 16:
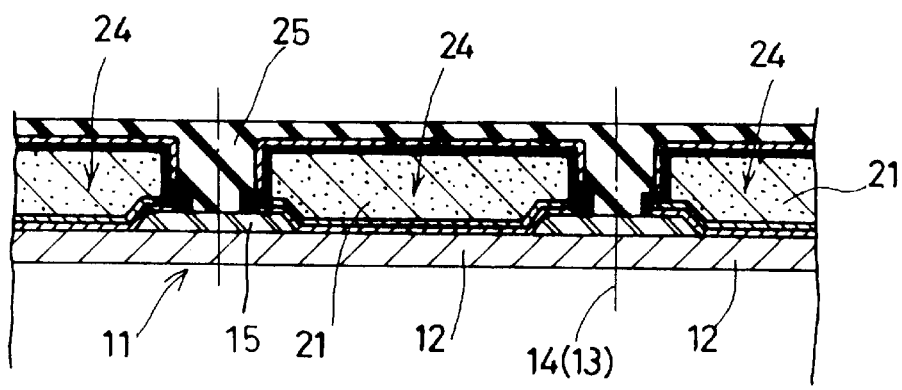
FIG. 16 is an enlarged sectional view showing the state wherein a resin coating has been formed on the master substrate according to the first embodiment.

Then, after forming a coating graphite layer (not shown) over the entire surface of each capacitor element 24, a resin coating 25 of e.g. a polyimide or epoxy resin is formed over the entire upper surface of the master substrate 11 to cover the entire surfaces of the capacitor element 24, as shown in FIG. 16.

Figure 17:
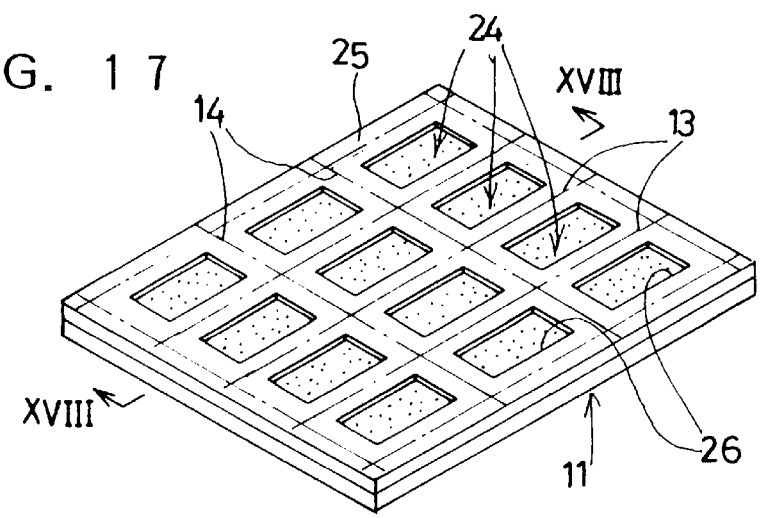
FIG. 17 is a perspective view showing the state wherein window openings have been formed in the resin coating according to the first embodiment.
Figure 18:
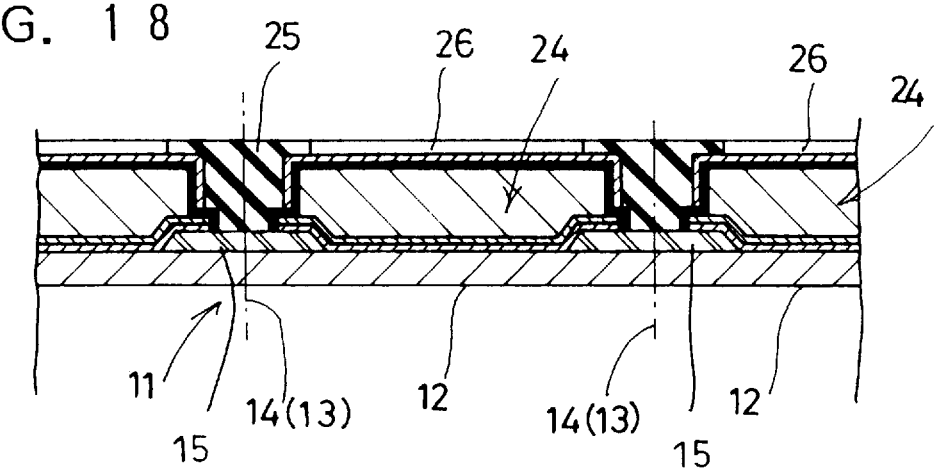
FIG. 18 is an enlarged sectional view taken along lines XVIII—XVIII in FIG. 17.

Then, as shown in FIGS. 17 and 18, a window opening 24 is formed, by photolithography for example, in the resin coating 25 at the portions thereof corresponding to the upper surface of each capacitor element 24.

Figure 19:
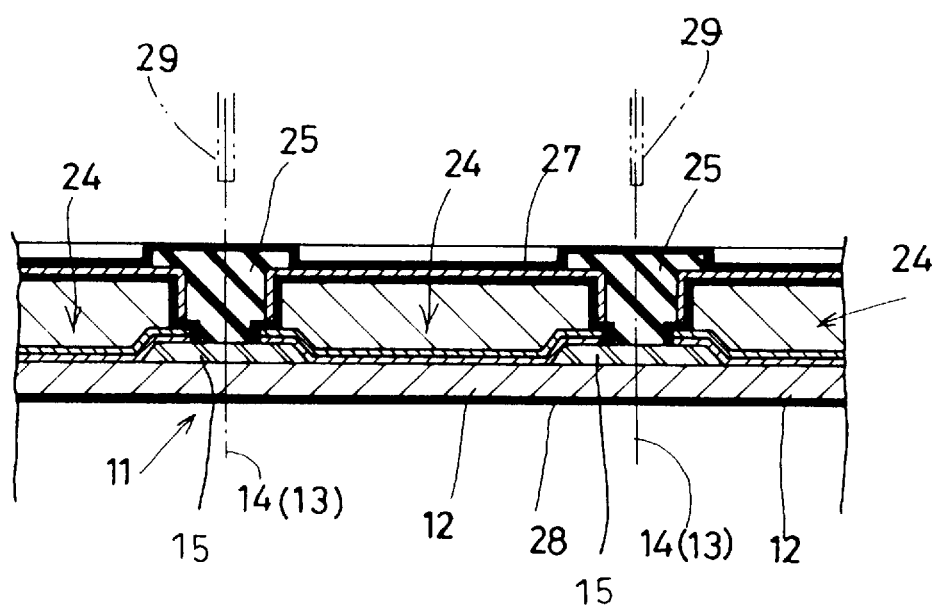
FIG. 19 is a perspective view showing the state wherein a cathode terminal electrode film and an anode terminal electrode film have been formed according to the first embodiment.

Then, as shown in FIG. 19, a cathode terminal electrode film 27 including a base nickel layer and an upper solder layer is formed on the upper surface of each capacitor element 24 by sputtering for example. The cathode terminal electrode film 27 conducts electrically with the solid electrode layer 23 via the above-described graphite layer.

On the other hand, as also shown in FIG. 19, an anode terminal electrode film 28 including a base nickel layer and an upper solder layer is formed on the lower surface of each capacitor element 24 by sputtering for example.

Finally, as also shown in FIG. 19, the master substrate 11 and the resin coating 25 are cut along the respective cutting lines 13, 14 by high-speed rotary cutters 29 for division into the respective chip substrate segments 19. As a result, a plurality of tantalum solid electrolytic capacitors are obtained.

FIGS. 20 through 22 show the structure of the tantalum solid electrolytic capacitor 30 obtained by the above-described process. The the tantalum solid electrolytic capacitor 30 has a width W, a length L and a high H.

The the tantalum solid electrolytic capacitor 30 comprises a chip substrate segment 12, a sintered tantalum powder chip 21 formed on the chip substrate segment 12, and a solid electrolyte layer 23 formed on the chip 21 but electrically insulated from the tantalum particles thereof via a dielectric layer 22. Further, the capacitor 30 also includes a resin coating 25 covering the chip 21 except for a central portion of its upper surface, a cathode terminal electrode film 27 formed on the exposed portion of the solid electrolyte layer 23 in electrical conduction therewith, and an anode terminal electrode film 28 formed on the lower surface of each capacitor element 24 in electrical conduction therewith. The tantalum particles of the chip 21 conduct with the anode terminal electrode film 28 via the tantalum silicide thin layer 17, the bonding metal layer 18 and the chip substrate segment 12. On the other hand, electrical insulation between the anode side and cathode side of the tantalum solid electrolytic capacitor 30 is established by the insulating 15 formed on the upper surface of the chip substrate segment 12.

Figure 23:
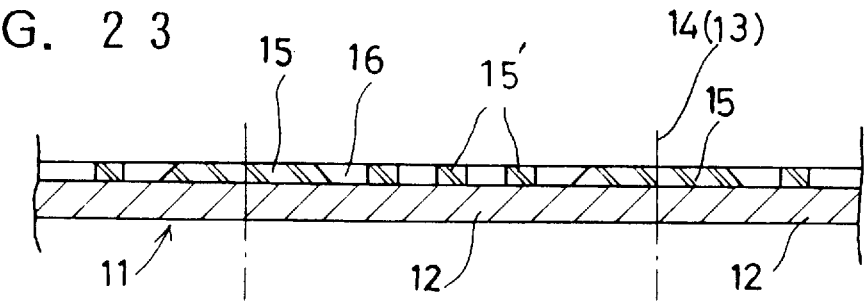
FIG. 23 is an enlarged sectional view showing a principal portion of a modification of the first embodiment.
Figure 24:
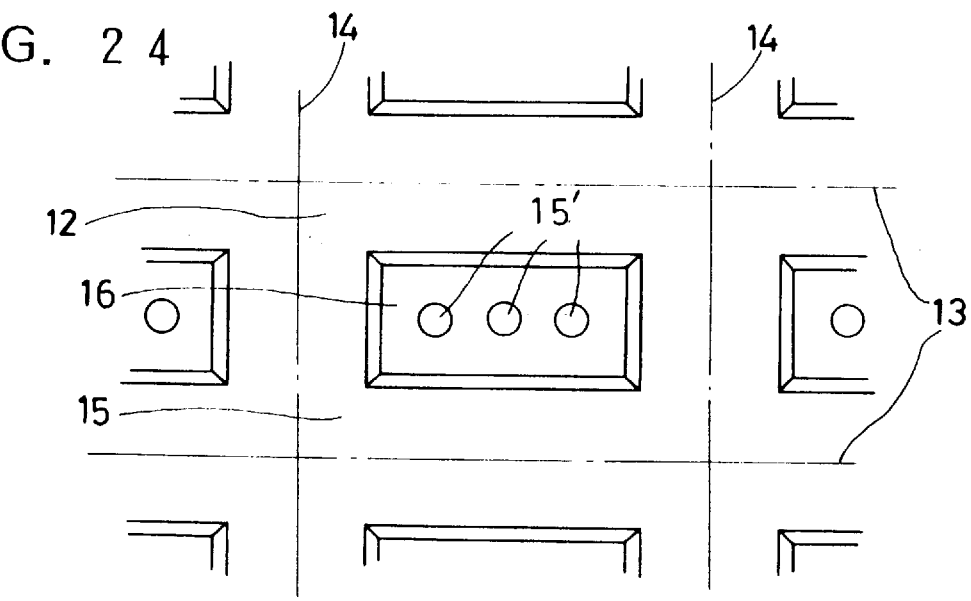
FIG. 24 is a plan view showing the modification of FIG. 23.
Figure 25:
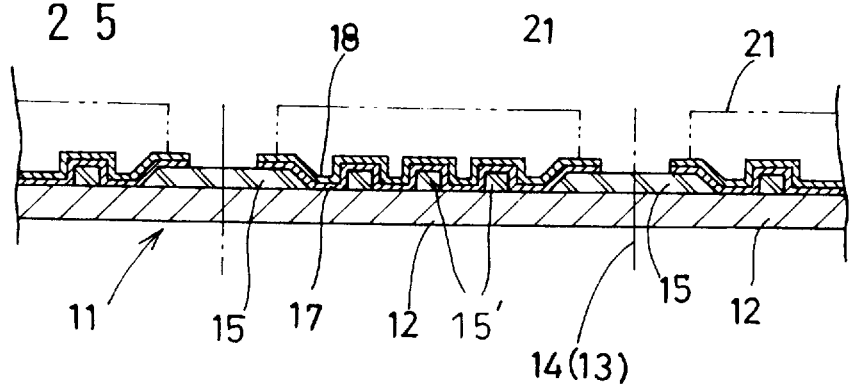
FIG. 25 is an enlarged sectional view showing the state wherein a thin layer of tantalum silicide and a bonding metal layer have been formed in the modification of FIG. 23.

The first embodiment of the present invention may be modified in the manner illustrated in FIGS. 23 through 25. Specifically, as shown in FIGS. 23 and 24, the bonding openings 15 are formed in the insulating layer 15 in a manner such that part of the insulating layer 15 remains a plurality of projections 15' in each of the bonding openings 15. As a result, the bonding metal layer 18 subsequently formed is rugged, as shown in FIG. 25.

According to the above-described modification, it is possible to increase the contact area between the tantalum powder of the chip 21 of the capacitor element 24 and the bonding metal layer 18 (bonding layer). This improves the bonding strength and reliability when bonding the chip 21 to the master substrate 11 simultaneously with sintering the chip 21.

Figure 34:
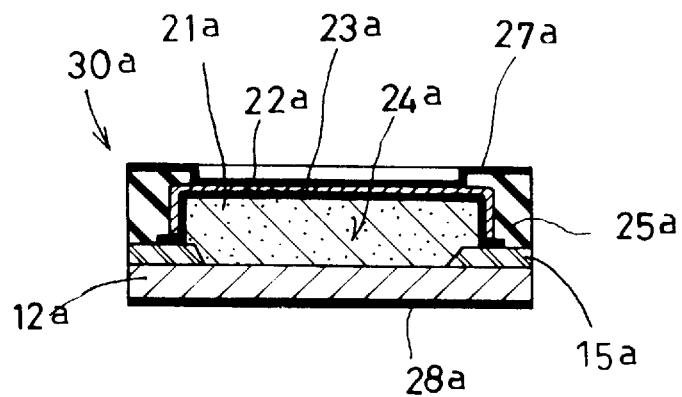
FIG. 34 is an enlarged sectional view showing a solid electrolytic capacitor made according to the second embodiment.

FIGS. 26 through 34 show a second embodiment of the present invention. In this embodiment, use is made of a tantalum master substrate for making a tantalum solid electrolytic capacitor 30a (FIG. 34).

Figure 26:
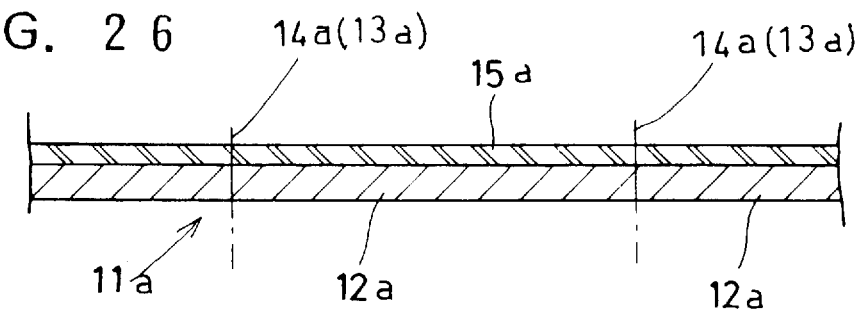
FIG. 26 is an enlarged sectional view showing a master substrate for use in a second embodiment of the present invention.

According to the second embodiment, as shown in FIG. 26, a master substrate 11a made of tantalum is first prepared which corresponds in size to a plurality of chip substrate segments 12a, and an insulating film 15a made of silicon oxide or nitride for example is formed on the master substrate 11a by thermal oxidation, PV sputtering or plasma CVD for example.

Figure 27:
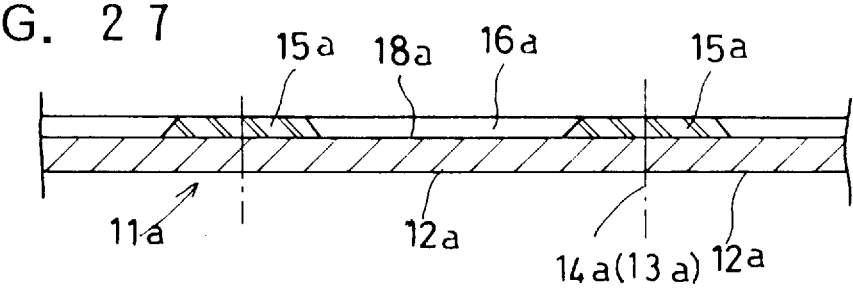
FIG. 27 is an enlarged sectional view showing the state wherein bonding openings has been formed in an insulating layer according to the second embodiment.

Then, as shown in FIG. 27, bonding openings 16a are formed, by known photolithography for example, in the insulating film 15a at the portions thereof corresponding to the respective chip substrate segments 12a. As a result, a bonding surface 18a provided by the original surface of the master substrate 11a is exposed.

Figure 28:
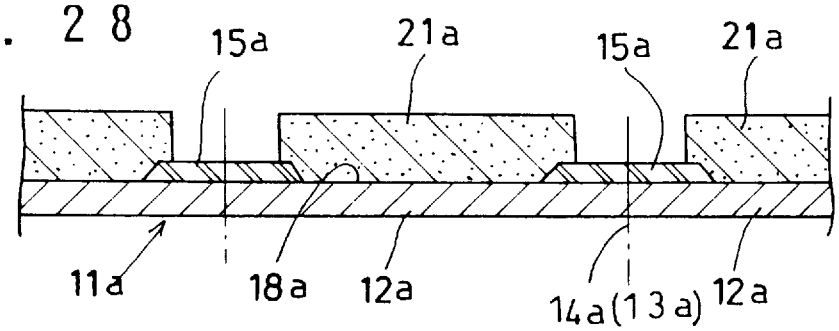
FIG. 28 is an enlarged sectional view showing the state wherein chips have been compacted on the master substrate according to the second embodiment.
Figure 29:
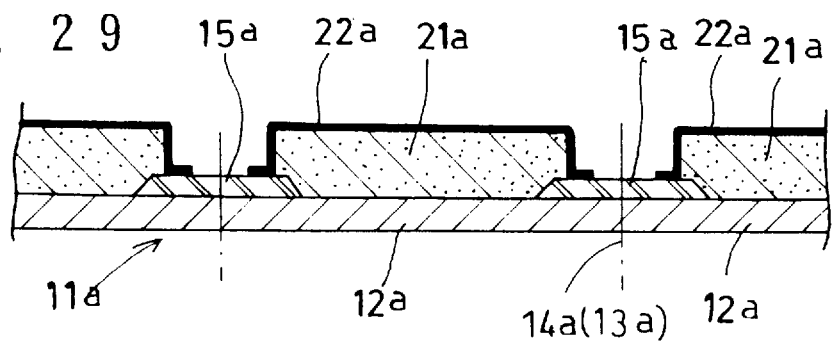
FIG. 29 is an enlarged sectional view showing the state wherein a dielectric layer has been formed on the chips according to the second embodiment.
Figure 30:
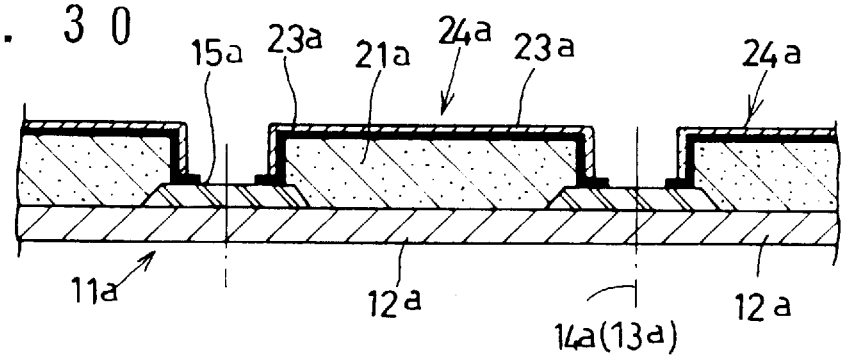
FIG. 30 is an enlarged sectional view showing the state wherein a solid electrolyte layer has been formed on the chips according to the second embodiment.
Figure 31:
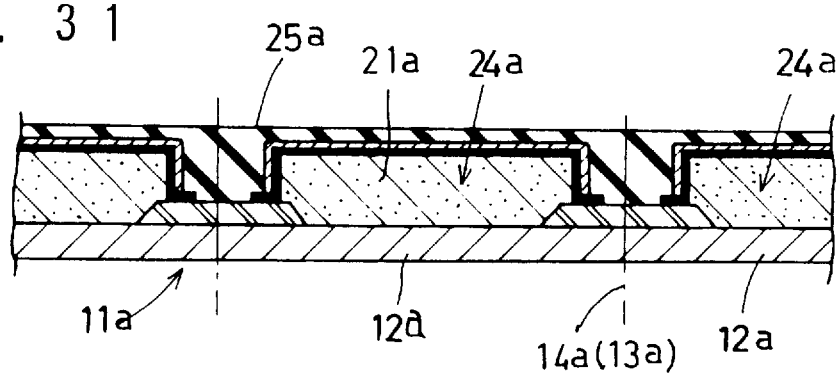
FIG. 31 is an enlarged sectional view showing the state wherein a resin coating have been formed on the master substrate according to the second embodiment.
Figure 32:
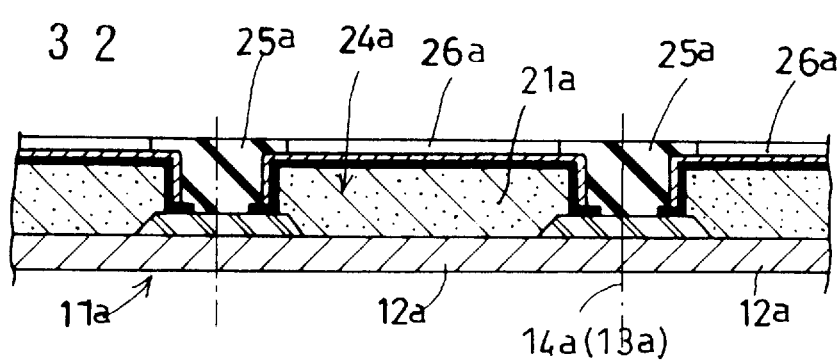
FIG. 32 is an enlarged sectional view showing the state wherein window openings have been formed in the resin coating according to the second embodiment.
Figure 33:
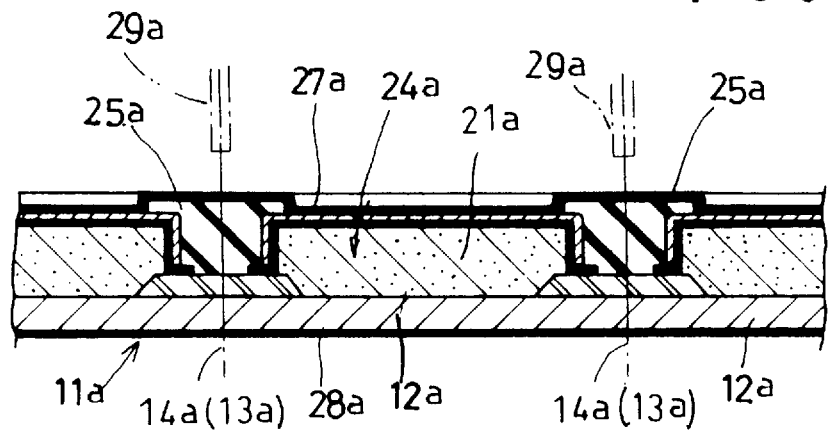
FIG. 33 is an enlarged sectional view showing the state wherein a cathode terminal electrode film and an anode terminal electrode film have been formed according to the second embodiment.

Then, as shown in FIG. 28, tantalum powder is compacted into chips 21a at each of the bonding openings 16a as in the first embodiment, and after a debinder treatment the master substrate 11a is placed in a vacuum heating oven (not shown) and heated to the sintering temperature of tantalum under vacuum. As a result, the tantalum powder of each chip 21a is sintered while also fusing to the bonding surface 18a.

The above-described steps are followed by the steps which are similar to those of the first embodiment. These steps include forming a dielectric layer 22a of tantalum pentoxide on each chip 21a (FIG. 29), forming a solid electrolyte layer 23a of manganese nitrate (FIG. 30), forming a resin coating 25a (FIG. 31) after forming a coating graphite layer (not shown) to convert the chip 21a into a capacitor element 24a, forming window openings 26a in the resin coating 25a (FIG. 32), forming a cathode terminal electrode film 27a on the upper surface of the capacitor element 24a (FIG. 33), forming an anode terminal electrode film 28a on the lower surface of the master substrate 11a (also FIG. 33), and cutting the master substrate 11a and the resin coating 25a by a high-speed rotary cutter 29a or the like (also FIG. 33).

As shown in FIG. 34, the foregoing process steps result in simultaneous production of a plurality of tantalum solid electrolytic capacitors 30a each having a structure which is similar to that of the first embodiment. However, due to the use of the tantalum master substrate 11a in the second embodiment, since the surface of the master substrate 11a itself can be utilized as the bonding surface 18a, it is unnecessary to form a bonding metal layer of tantalum and a thin base layer of tantalum silicide on the master substrate, as opposed to the first embodiment.

In the second embodiment, the bonding surface 18a of the master substrate 11a may be rugged, as shown in FIGS. 23 through 25.

FIGS. 35 through 42 show a third embodiment of the present invention. In the third embodiment, a tantalum solid electrolytic capacitor 30b (FIG. 34) is manufactured by using a master substrate made of a ceramic material to which a conductive material such as BN (boron nitride) or SiC (silicon carbide) is added to impart electric conductivity.

Figure 35:
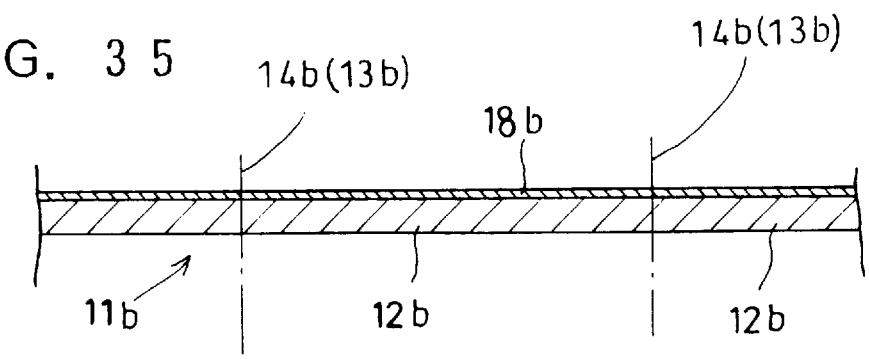
FIG. 35 is an enlarged sectional view showing a master substrate for use in a third embodiment of the present invention.

Specifically, according to the third embodiment, as shown in FIG. 35, a master substrate 11b made of a conductive ceramic material is first prepared which corresponds in size to a plurality of chip substrate segments 12b, and a tantalum bonding layer 18b is formed on the master substrate 11b by sputtering for example.

Figure 36:
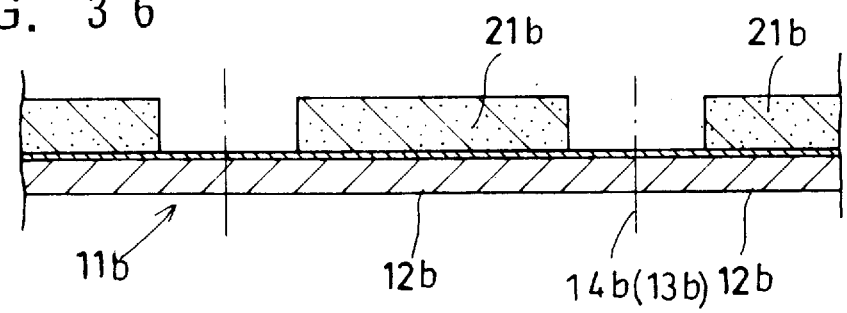
FIG. 36 is an enlarged sectional view showing the state wherein chips have been compacted on the master substrate according to the third embodiment.
Figure 37:
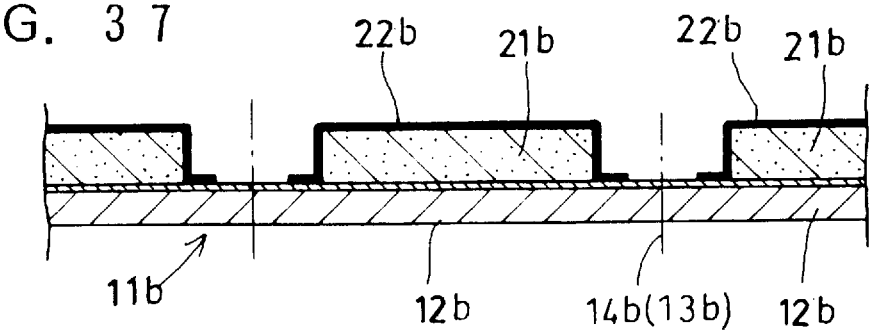
FIG. 37 is an enlarged sectional view showing the state wherein a dielectric layer has been formed on the chips according to the third embodiment.
Figure 38:
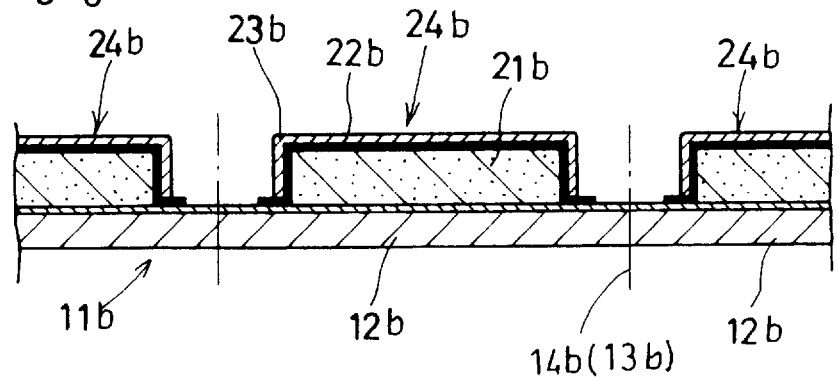
FIG. 38 is an enlarged sectional view showing the state wherein a solid electrolyte layer has been formed on the chips according to the third embodiment.
Figure 39:
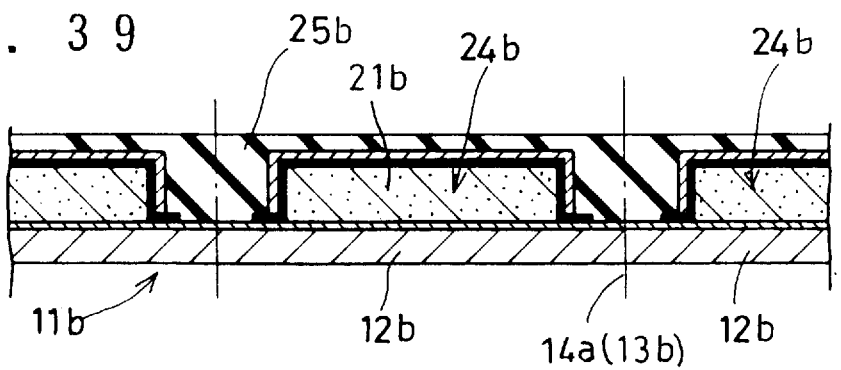
FIG. 39 is an enlarged sectional view showing the state wherein a resin coating have been formed on the master substrate according to the third embodiment.
Figure 40:
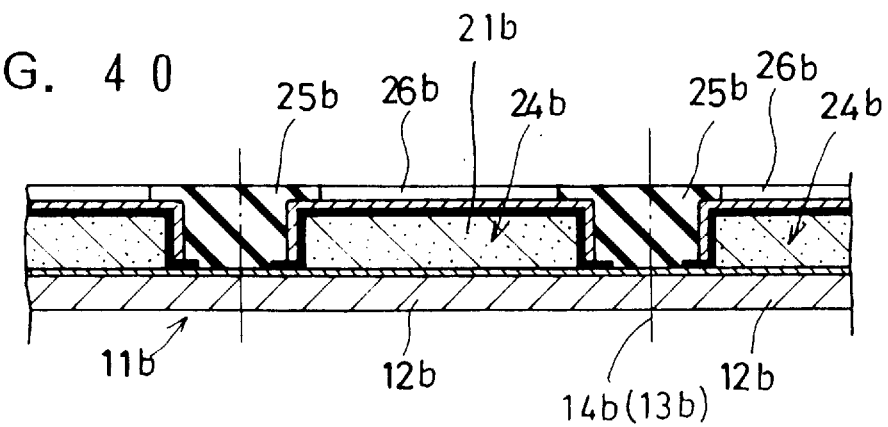
FIG. 40 is an enlarged sectional view showing the state wherein window openings have been formed in the resin coating according to the third embodiment.
Figure 41:
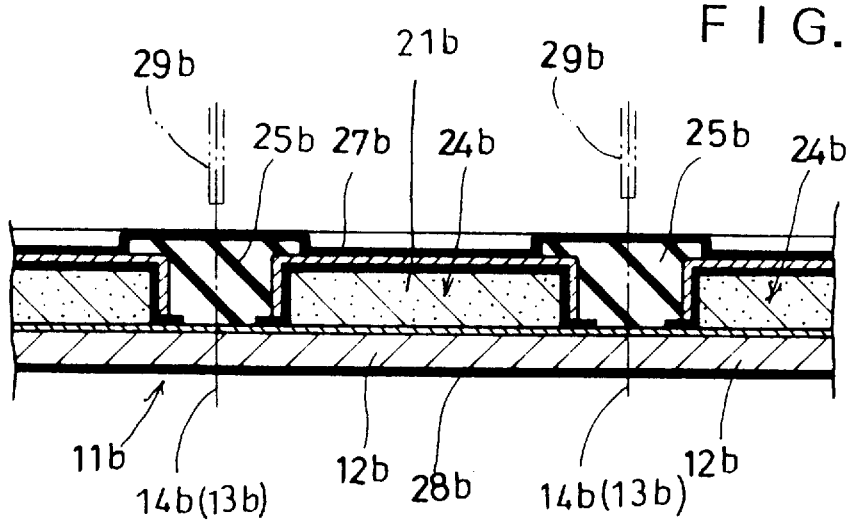
FIG. 41 is an enlarged sectional view showing the state wherein a cathode terminal electrode film and an anode terminal electrode film have been formed according to the third embodiment.

Then, as shown in FIG. 36, tantalum powder is compacted into chips 21b as in the first embodiment at the portions thereof corresponding to the respective chip substrate segments 12b, and after a debinder treatment the master substrate 11b is placed in a vacuum heating oven (not shown) and heated to the sintering temperature of tantalum under vacuum. As a result, the tantalum powder of each chip 21b is sintered while also fusing to the bonding metal layer 18b for bonding to the master substrate 11b.

Figure 42:
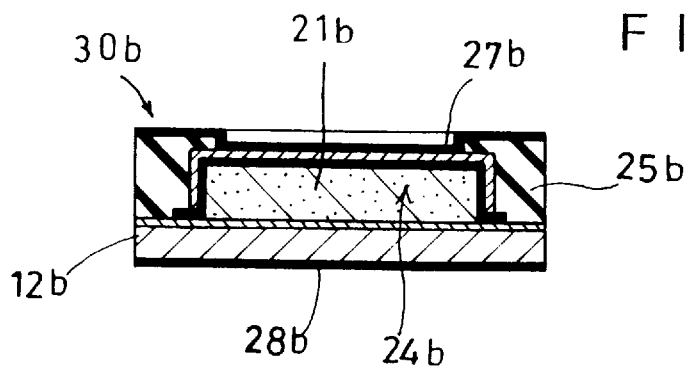
FIG. 42 is an enlarged sectional view showing a solid electrolytic capacitor made according to the third embodiment.

The above-described steps are followed by the steps which are similar to those of the first embodiment. These steps include forming a dielectric layer 22b of tantalum pentoxide on each chip 21b (FIG. 37), forming a solid electrolyte layer 23b of manganese nitrate (FIG. 38), forming a resin coating 25b (FIG. 39) after forming a coating graphite layer (not shown) to convert the chip 21b into a capacitor element 24b, forming window openings 26b in the resin coating 25b (FIG. 40), forming a cathode terminal electrode film 27b on the upper surface of the capacitor element 24b (FIG. 41), forming an anode terminal electrode film 28b on the lower surface of the master substrate 11b (also FIG. 41), and cutting the master substrate 11b and the resin coating 25b by a high-speed rotary cutter 29b or the like (also FIG. 41). As a result of these steps, a plurality of tantalum solid electrolytic capacitors 30b are produced simultaneously, as shown in FIG. 42.

According to the third embodiment, since an electrically conductive ceramic material is used to make the master substrate 11b, it is possible to realize a production cost decrease through saving of the material cost, as compared with the second embodiment wherein a tantalum master substrate is used.

Again, in the third embodiment, an insulating layer 15 or 15a may be formed on the master substrate 11b as in the first and second embodiments, and the bonding metal layer 18b on the master substrate 11b may be rugged in the same manner as shown in FIGS. 23 through 25.

Figure 43:
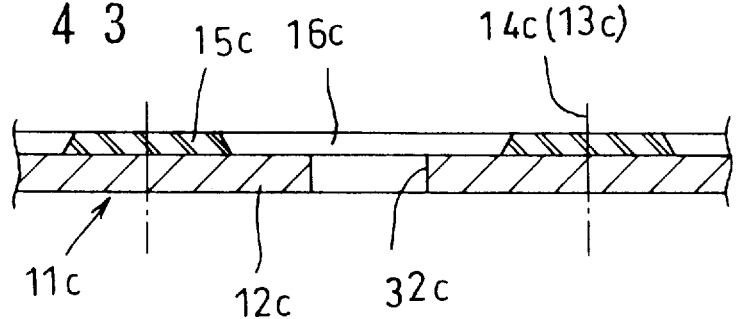
FIG. 43 is an enlarged sectional view showing a master substrate for use in a fourth embodiment of the present invention.
Figure 44:
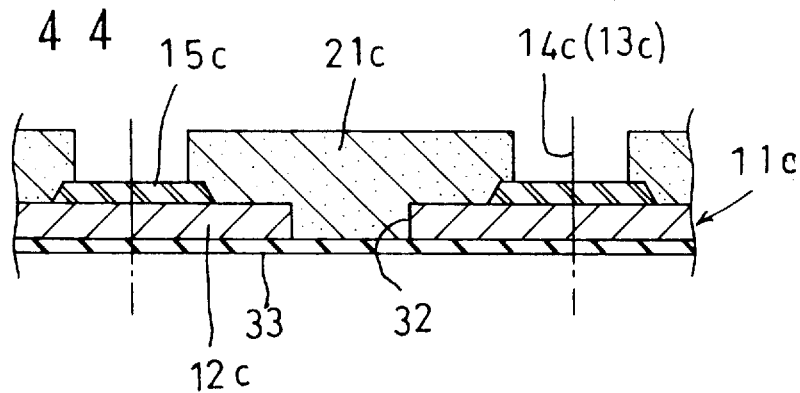
FIG. 44 is an enlarged sectional view showing the state wherein chips have been compacted on the master substrate according to the fourth embodiment.
Figure 45:
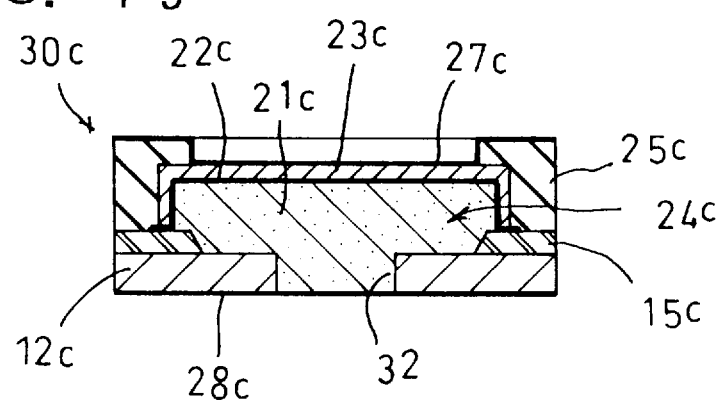
FIG. 45 is an enlarged sectional view showing a solid electrolytic capacitor made according to the fourth embodiment.

FIGS. 43 through 45 show a fourth embodiment of the present invention. In the fourth embodiment, a large-capacity tantalum solid electrolytic capacitor 30c is manufactured by using a master substrate 11c made of a material such as silicon, tantalum or electrically conductive ceramic which has an electric conductivity at least in its thickness direction.

Specifically, as shown in FIG. 43, an insulating layer 15c is formed on the master substrate 11c, and bonding openings 16c are thereafter formed in the insulating layer 15c at the portions thereof corresponding to the respective chip substrate segments 12c. Further, the master substrate 11c is formed with filling through-bores 32 at the portions thereof corresponding to the respective chip substrate segments 12c.

Then, as shown in FIG. 44, a film 33 is attached to the lower surface of the master substrate 11c to close the respective filling through-bores 32, and thereafter tantalum powder is compacted into chips 21c on the master substrate 11c in a manner such that the tantalum powder also fills the respective filling through-bores 32. The film 33 is removed after compacting the chips 21c.

The above-described steps are followed by the steps which are similar to those of each foregoing embodiment. These steps include sintering each of the chips 21c, forming a dielectric layer 22c on the chip 21c, forming a solid electrolyte layer 23c, forming a coating graphite layer to provide a capacitor element 24c, forming a resin coating 25c, forming a cathode terminal electrode film 27c, forming an anode terminal electrode film 28c, and cutting the master substrate 11c along the respective cutting lines for division into the respective chip substrate segments 12c. As a result of these steps, a plurality of tantalum solid electrolytic capacitors 30c each having the structure shown in FIG. 45 are produced simultaneously.

According to the fourth embodiment described above, since the tantalum powder of each chip 21c also fills the filling through-bore 32, the volume of the chip 21c is correspondingly increased, thereby increasing the capacity of the tantalum solid electrolytic capacitor 30c. Further, an additional advantage is also obtainable that the bonding strength between the chip substrate segment 12c and the chip 21c is increased by the portion of the chip 21c projecting into the filling through-bore 32.

In the fourth embodiment, the filling through-bore 32 may be replaced with a bottomed bore (or recess). However, the through-bore 32 makes it possible to directly and reliably bring the anode terminal electrode film 28c on the lower surface of the chip substrate segment 12c into electrical conduction with the tantalum powder of the chip 21c with the intervention of the chip substrate segment 12c. It is therefore possible to reduce the need for forming a bonding metal layer on the upper surface of the master substrate 11c as in the first and third embodiments or for providing a rugged bonding metal layer as shown in FIGS. 23 through 25.

FIGS. 46 through 50 show a fifth embodiment of the present invention. In the fifth embodiment, a large-capacity tantalum solid electrolytic capacitor 30d (FIG. 50) is manufactured by using a master substrate 11d made of an insulating material such as a ceramic material.

Figure 46:
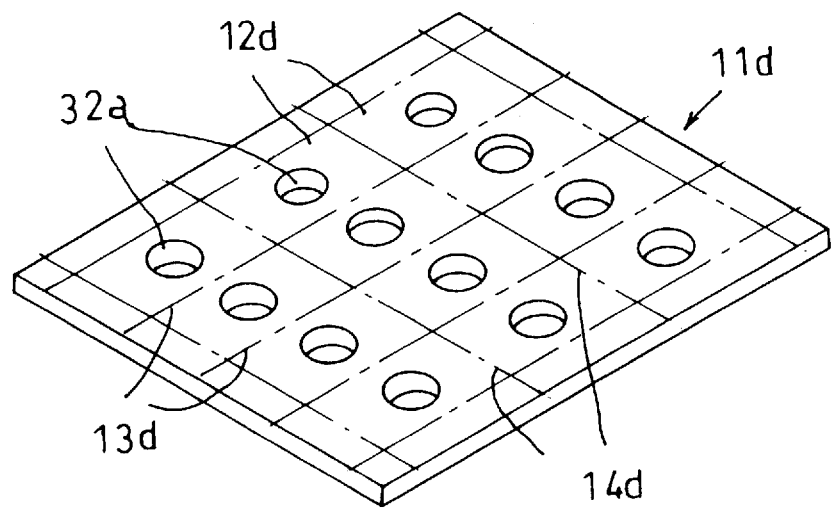
FIG. 46 is a perspective view showing a master substrate for use in a fifth embodiment of the present invention.

In the fifth embodiment, as shown in FIG. 46, a master substrate 11d of an insulating ceramic material is first prepared which corresponds in size to a plurality of chip substrate segments 12d and which is formed with filling through-bores 32a at the portions thereof corresponding to the respective chip substrate segments 12d.

Figure 47:
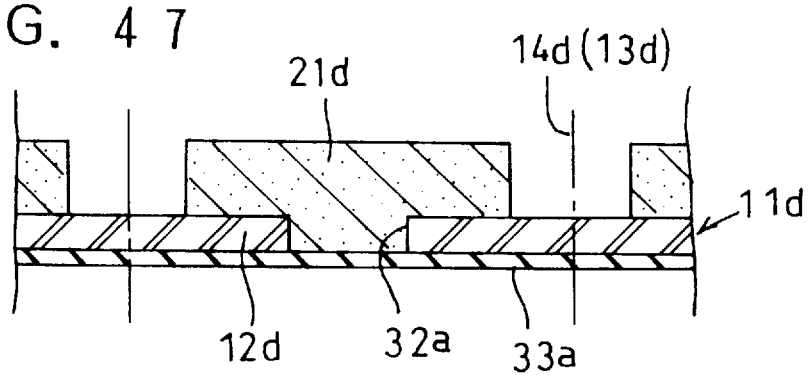
FIG. 47 is an enlarged sectional view showing the state wherein chips have been compacted on the upper surface of the master substrate according to the fifth embodiment.
Figure 48:
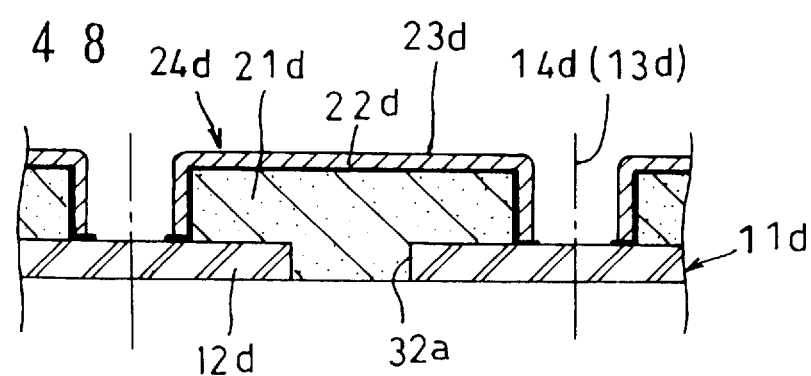
FIG. 48 is an enlarged sectional view showing the state wherein a dielectric layer and a solid electrolyte layer have been formed on the chips according to the fifth embodiment.
Figure 49:
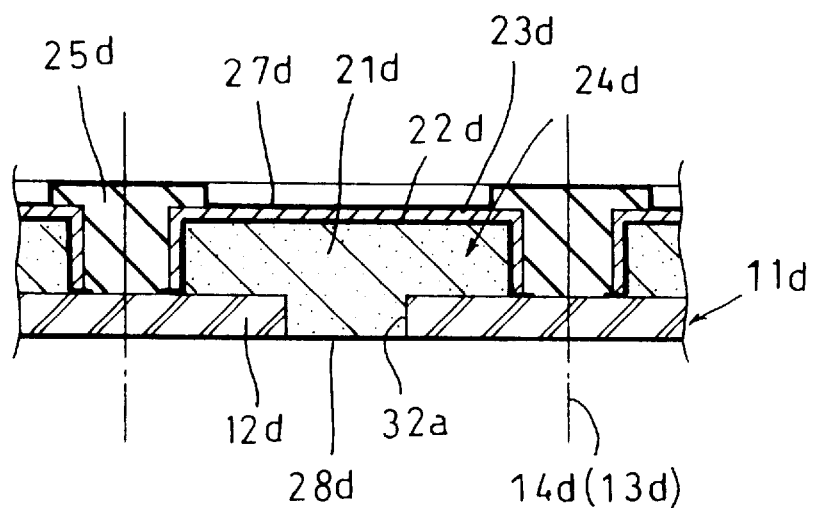
FIG. 49 is an enlarged sectional view showing the state wherein a resin coating, a cathode terminal electrode film and an anode terminal electrode film have been formed according to the fifth embodiment.

Then, as shown in FIG. 47, a film 33a is attached to the lower surface of the master substrate 11d to close the respective filling through-bores 32a, and thereafter tantalum powder is compacted into chips 21d on the master substrate lid in a manner such that the tantalum powder also fills the respective filling through-bores 32a. The film 33a is removed after compacting the chips 21d.

Figure 50:
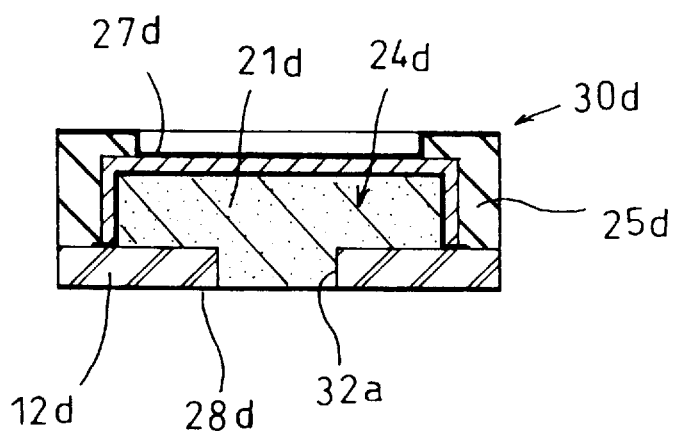
FIG. 50 is an enlarged sectional view showing a solid electrolytic capacitor made according to the fifth embodiment.

The above-described steps are followed by the steps which are similar to those of each foregoing embodiment. These steps include sintering each of the chips 21d, forming a dielectric layer 22d on the chip 21d (FIG. 48), forming a solid electrolyte layer 23d (also FIG. 48), forming a coating graphite layer to provide a capacitor element 24d (also FIG. 48), forming a resin coating 25d (FIG. 49), forming a cathode terminal electrode film 27d (also FIG. 49), forming an anode terminal electrode film 28d (also FIG. 49), and cutting the master substrate 11d along the respective cutting lines 13d, 14d for division into the respective chip substrate segments 12d. As a result of these steps, a plurality of tantalum solid electrolytic capacitors 30d each having the structure shown in FIG. 50 are produced simultaneously.

The fifth embodiment described above is similar to the fourth embodiment in that the tantalum powder of the chip 21d which fills the filling through-bore 32a increases the capacity of the tantalum solid electrolytic capacitor 30d. In addition, according to the fifth embodiment, since the chip substrate segment 12d is made of an insulating material such as ceramic material, the anode and cathode sides of the capacitor element 24d can be reliably insulated electrically without separately providing an insulating layer on the chip substrate segment 12d, thereby providing an advantage of realizing a cost and weight reduction in comparison with the case wherein the chip substrate segment 12d is made of a conductive material.

FIGS. 51 through 56 show a sixth embodiment of the present invention. In the sixth embodiment, a large-capacity tantalum solid electrolytic capacitor 30e (FIG. 56) is manufactured by using a master substrate 11e made of an insulating material such as a ceramic material as in the fifth embodiment.

Figure 51:
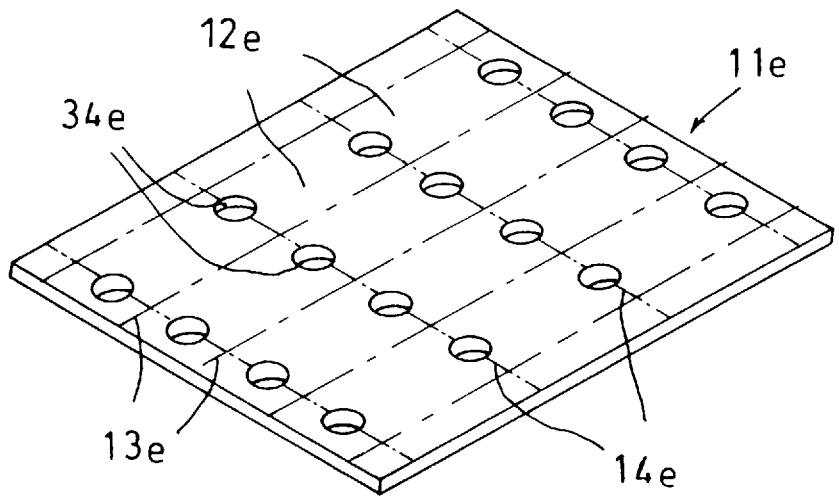
FIG. 51 is a perspective view showing a master substrate for use in a sixth embodiment of the present invention.

According to the sixth embodiment, as shown in FIG. 51, a master substrate 11e of an insulating ceramic material is first prepared which corresponds in size to a plurality of chip substrate segments 12e and which is formed with conduction through-bores 34 between the respective chip substrate segments 12e.

Figure 52:
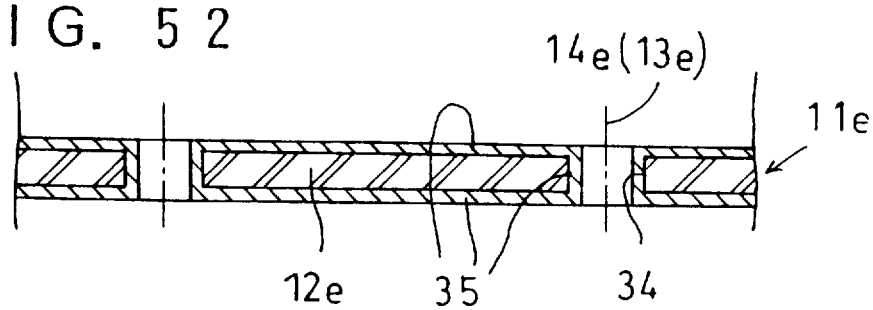
FIG. 52 is an enlarged sectional view showing the state wherein a metal film has been formed on the master substrate according to the sixth embodiment.

Then, as shown in FIG. 52, a metal layer 35 of e.g. tantalum is formed on the upper and lower surfaces of the master substrate and the inner surfaces of the respective conduction through-bores 34.

Figure 53:
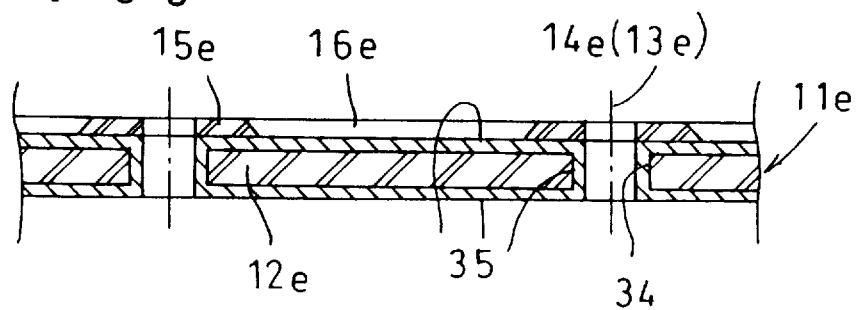
FIG. 53 is an enlarged sectional view showing the state wherein an insulating layer has been formed on the master substrate according to the sixth embodiment.

Then, as shown in FIG. 53, an insulating layer 15e is formed on the upper surface of the master substrate 11e, and bonding openings 16e are formed in the insulating layer 15e.

Figure 54:
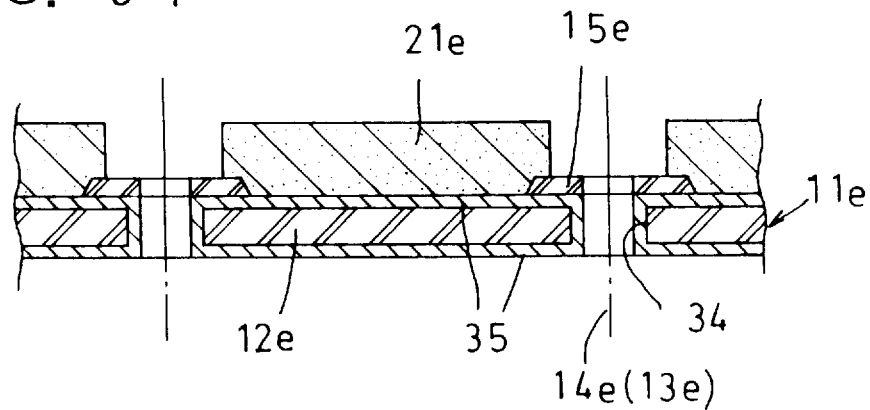
FIG. 54 is an enlarged sectional view showing the state wherein chips have been compacted on the master substrate according to the sixth embodiment.
Figure 55:
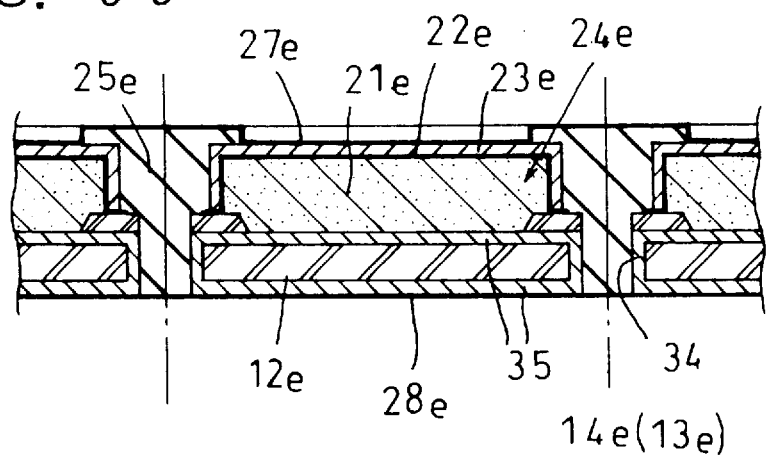
FIG. 55 is an enlarged sectional view showing the state wherein a dielectric layer, a solid electrolyte layer, a resin coating, a cathode terminal electrode film and an anode terminal electrode film have been formed according to the sixth embodiment.

Then, as shown in FIG. 54, tantalum powder is compacted into chips 21e on the master substrate 11e.

Figure 56:
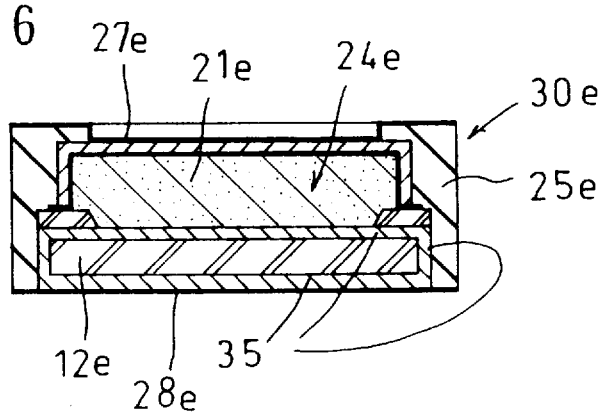
FIG. 56 is an enlarged sectional view showing a solid electrolytic capacitor made according to the sixth embodiment.
Figure 57:
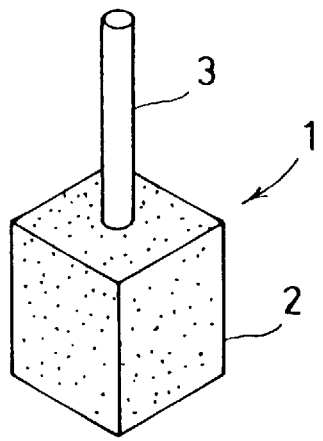
FIG. 57 is a perspective view showing a capacitor element for use in making a prior art solid electrolytic capacitor.
Figure 58:
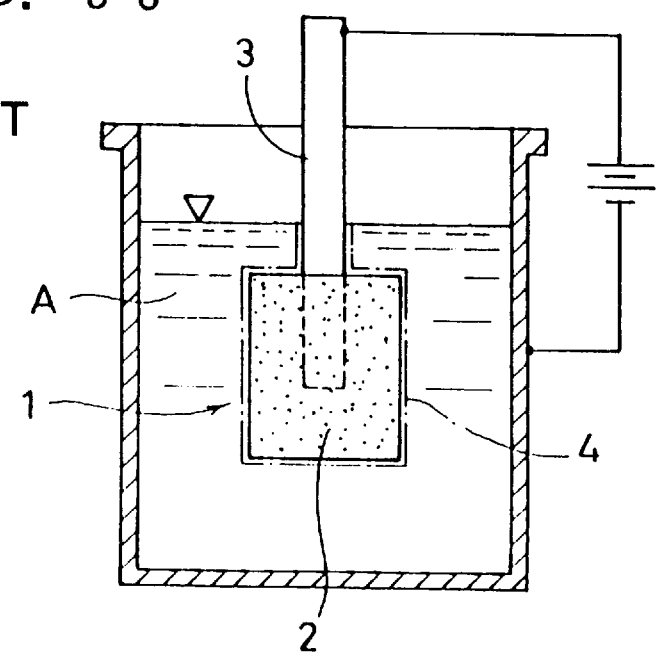
FIG. 58 is a view showing the process step of forming a dielectric layer on the capacitor element of FIG. 57.
Figure 59:
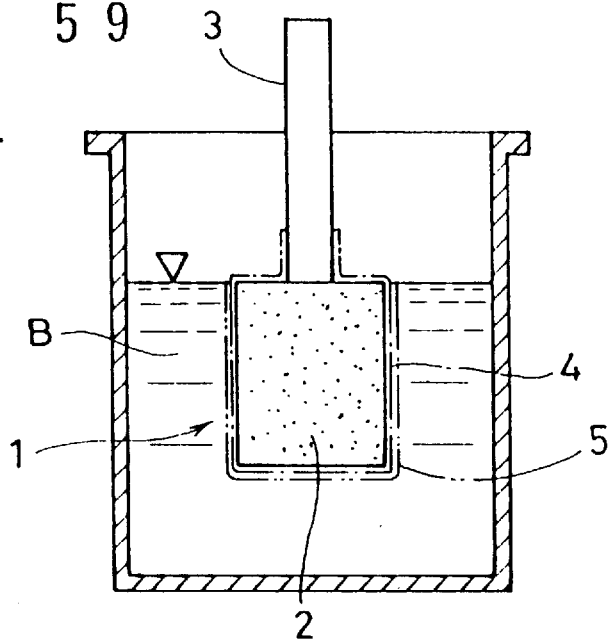
FIG. 59 is a view showing the process step of forming a solid electrolyte layer on the capacitor element of FIG. 57.
Figure 60:
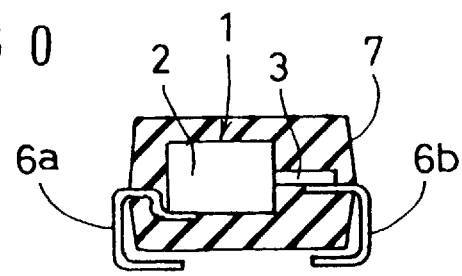
FIG. 60 is a sectional front view showing a prior art solid electrolytic capacitor.
Figure 61:
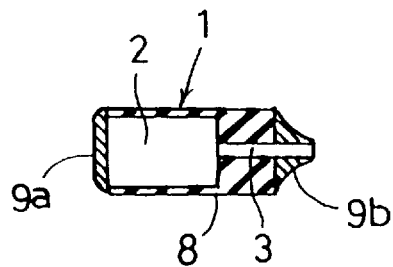
FIG. 61 is a sectional front view showing another prior art solid electrolytic capacitor.
Figure 62:
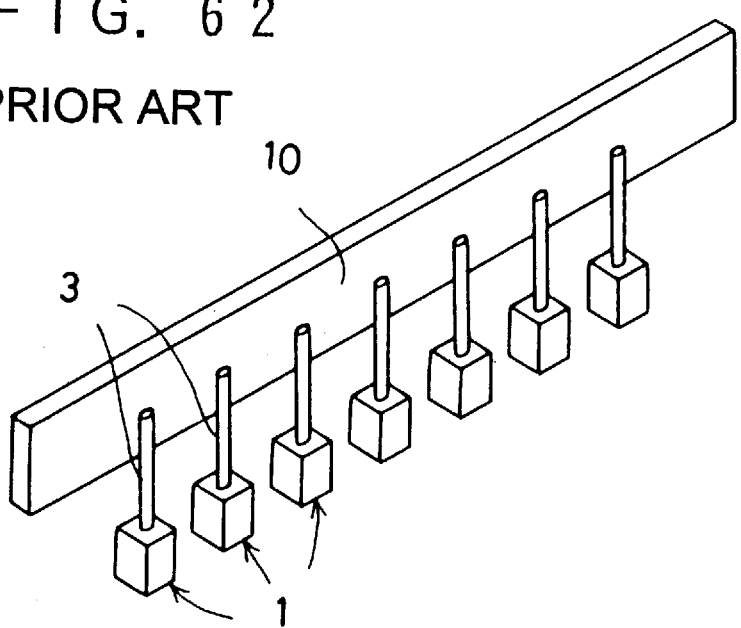
FIG. 62 is a perspective view showing the state wherein capacitor elements are attached to a metal bar in the process of making prior art solid electrolytic capacitors.

The above-described steps are followed by the steps which are similar to those of each foregoing embodiment. These steps include sintering each of the chips 21e, forming a dielectric layer 22e on the chip 21e (FIG. 55), forming a solid electrolyte layer 23e (also FIG. 55), forming a coating graphite layer to provide a capacitor element 24e (also FIG. 55), forming a resin coating 25e (also FIG. 55), forming a cathode terminal electrode film 27e (also FIG. 55), forming an anode terminal electrode film 28e (also FIG. 55), and cutting the master substrate 11e along the respective cutting lines 13e, 14e for division into the respective chip substrate segments 12e. As a result of these steps, a plurality of tantalum solid electrolytic capacitors 30e each having the structure shown in FIG. 56 are produced simultaneously.

According to the sixth embodiment described above, while the chip substrate segment 12e is made of an inexpensive insulating material, it is possible to reliably establish electrical connection between the anode terminal electrode film 28e on the lower surface of the chip substrate segment and the tantalum particles of the chip 21e via the metal layer 35 formed on the chip substrate segment 12e.

I claim:

1. A solid electrolytic capacitor comprising:
   a chip substrate segment;
   a sintered chip of metal powder mounted on an upper surface of the chip substrate segment;
   a solid electrolyte layer formed on the chip in electrical insulation from the metal powder of the chip via a dielectric film;
   a resin coating covering the chip with a portion of the solid electrolyte layer exposed;
   a cathode terminal electrode film formed in electrical conduction with the exposed portion of the solid electrolyte layer; and
   an anode terminal electrode film formed on the chip substrate segment in electrical conduction with the metal powder of the chip.

2. The solid electrolytic capacitor of claim 1, wherein the anode terminal electrode film is formed on a lower surface of the chip substrate segment, the resin coating being formed to cover the entire side surfaces of the chip.

3. The solid electrolytic capacitor of claim 1, wherein the chip substrate segment is formed with a filling bore extending from the upper surface thereof, the metal powder of the chip filling the filling bore.

4. The solid electrolytic capacitor of claim 1, wherein the chip substrate segment has a predetermined thickness and is made of a material that has electrical conductivity through the predetermined thickness of the chip substrate.

5. The solid electrolytic capacitor of claim 1, wherein the chip substrate segment is made of an insulating material, the chip substrate segment being formed with a metal layer for electrically connecting the metal powder of the chip and the anode terminal electrode film.

6. The solid electrolytic capacitor of claim 3, wherein the filling bore of the chip substrate segment is a through-bore, a portion of the metal powder located within the through-bore being bonded to the anode terminal electrode film on the chip substrate segment.

7. The solid electrolytic capacitor of claim 4, wherein an insulating layer is formed on the upper surface of the chip substrate segment to surround the chip for electrically insulating between the chip substrate segment and the solid electrolyte layer.

8. The solid electrolytic capacitor of claim 4, wherein the chip substrate segment is made of silicon.

9. The solid electrolytic capacitor of claim 4, wherein the chip substrate segment is made of the same metal material as the metal powder of the chip.

10. The solid electrolytic capacitor of claim 4, wherein the chip substrate segment is made of a conductive ceramic material containing a conductive substance.

* * * * *